United States Patent
Li et al.

(10) Patent No.: US 10,496,273 B2
(45) Date of Patent: Dec. 3, 2019

(54) DISMISSING DISPLAYED ELEMENTS

(71) Applicant: Google LLC, Mountain View, CA (US)

(72) Inventors: Yuan Hang Li, Milpitas, CA (US);
Michael Alexander Digman, Mountain View, CA (US); Jia Wei Tam, Seattle, WA (US); Gyeong Sik Choi, Sunnyvale, CA (US); Relly Brandman, Menlo Park, CA (US); Angela Park, Santa Clara, CA (US); Stephen John Tapper, Sunnyvale, CA (US); Aurora Marian Adkins, Redwood City, CA (US); Dylan Thomas Casano, Oakland, CA (US)

(73) Assignee: Google LLC, Mountain View, CA (US)

( * ) Notice: Subject to any disclaimer, the term of this patent is extended or adjusted under 35 U.S.C. 154(b) by 91 days.

(21) Appl. No.: 15/841,578

(22) Filed: Dec. 14, 2017

(65) Prior Publication Data
US 2018/0275863 A1    Sep. 27, 2018

Related U.S. Application Data

(60) Provisional application No. 62/477,267, filed on Mar. 27, 2017.

(51) Int. Cl.
*G06F 3/033* (2013.01)
*G06F 3/0488* (2013.01)
(Continued)

(52) U.S. Cl.
CPC ........ *G06F 3/04883* (2013.01); *G06F 3/0481* (2013.01); *G06F 3/0482* (2013.01); *G06F 3/04845* (2013.01); *G06F 3/0488* (2013.01)

(58) Field of Classification Search
None
See application file for complete search history.

(56) References Cited

U.S. PATENT DOCUMENTS

| 7,561,146 B1 | 7/2009 | Hotelling |
| 7,616,104 B2 | 11/2009 | Hara et al. |

(Continued)

FOREIGN PATENT DOCUMENTS

| EP | 2450771 | 5/2012 |
| GB | 2502178 | 11/2013 |

(Continued)

OTHER PUBLICATIONS

Shalini Gupta et al., Towards Selecting Robust Hand Gestures for Automotive Interfaces, Jun. 1, 2016, IEEE Intelligent Vehicles Symposium, pp. 1-8 (Year: 2016).*

(Continued)

*Primary Examiner* — Tam T Tran
(74) *Attorney, Agent, or Firm* — Shumaker & Sieffert, P.A.

(57) ABSTRACT

Methods, systems, and apparatus, including computer programs encoded on a computer storage medium, for dismissing displayed elements. In some implementations, a device with a touchscreen is operated using a first touch input threshold value, which may correspond to a minimum distance of input to the touchscreen to identify a gesture. An automobile mode event is detected that initiates an automobile mode for the device. A user input to the touchscreen of the device is received while the device is in the automobile mode. Using a second touch input threshold value corresponding to the automobile mode, the device determines that the user input to the touchscreen of the device represents a gesture corresponding to a user interface element displayed on the device. The device dismisses the user interface element so that the user interface element is no longer displayed.

15 Claims, 6 Drawing Sheets

(51) Int. Cl.
*G06F 3/0482* (2013.01)
*G06F 3/0484* (2013.01)
*G06F 3/0481* (2013.01)

(56) References Cited

U.S. PATENT DOCUMENTS

| | | |
|---|---|---|
| 2010/0188328 A1 | 7/2010 | Dodge |
| 2011/0248948 A1* | 10/2011 | Griffin .................. G06F 3/041 345/174 |
| 2012/0102437 A1* | 4/2012 | Worley .............. G06F 3/04883 715/863 |
| 2012/0158629 A1 | 6/2012 | Hinckley et al. |
| 2013/0038437 A1 | 2/2013 | Talati et al. |
| 2013/0067421 A1 | 3/2013 | Osman et al. |
| 2013/0265269 A1 | 10/2013 | Sharma et al. |
| 2013/0300696 A1 | 11/2013 | Haran et al. |
| 2014/0267135 A1 | 9/2014 | Chhabra |
| 2014/0298266 A1 | 10/2014 | Lapp |
| 2014/0368436 A1 | 12/2014 | Abzarian et al. |
| 2015/0046884 A1* | 2/2015 | Moore .................. G06F 3/0481 715/863 |
| 2016/0062540 A1 | 3/2016 | Yang et al. |
| 2016/0077650 A1 | 3/2016 | Durojaiye et al. |
| 2016/0085397 A1 | 3/2016 | Jain |

FOREIGN PATENT DOCUMENTS

| | | |
|---|---|---|
| WO | WO 2013/071198 | 5/2013 |
| WO | WO 2015/160752 | 10/2015 |
| WO | WO 2016/040715 | 3/2016 |

OTHER PUBLICATIONS

The searchfor a safer driver interface: a review of gesture recognition Human Machine Interface, Feb. 1, 2005, IEEE Computing & Control Engineering, pp. 34-40 (Year: 2005).*

International Search Report and Written Opinion issued in International Application No. PCT/US2017/066255, dated Feb. 21, 2018, 16 pages.

'www.androidpolice.com' [online] "Android Auto (Pioneer 8100NEX) Review: A Worthwhile Convenience If Money is no Object," Ryan Whitwam, Jun. 9, 2015, [retrieved on Feb. 14, 2018] Retrieved from Internet: URL<https://www.androidpolice.com/2015-06-09/android-auto-pioneer-8100nex-review-a-wworthwhile-convenience-if-money-is-no-object/#android_Auto_Interface> 15 pages.

'www.androidcentral.com' [online] "Getting started with Android Auto in your car," Phil Nickinson, Apr. 26, 2015, [retrieved on Feb. 14, 2018] Retrieved from Internet: URL<https://www.androidcentral.com/android-auto-basics> 9 pages.

Response to Written Opinion dated Feb. 21, 2018, from International Application No. PCT/US2017/066255, dated Dec. 11, 2018, 14 pp.

Second Written Opinion of International Application No. PCT/US2017/066255, dated Jan. 23, 2019, 9 pp.

* cited by examiner

DISMISSING DISPLAYED ELEMENTS

CROSS-REFERENCE TO RELATED APPLICATION

This application claims the benefit of U.S. Provisional Patent Application Ser. No. 62/477,267, filed on Mar. 27, 2017, the entire contents of which are incorporated herein by reference.

FIELD

The present specification generally relates to user input for dismissing displayed elements, and in particular, in an automotive setting.

BACKGROUND

Some devices include touchscreens for receiving input, some devices include physical buttons or rotary elements for input, and some devices include both. Devices with a touchscreen accept input by detecting movements of an input object in contact with the touchscreen. Such movements are typically referred to as gestures. Upon detection of a gesture, a device may execute an action. In an automotive setting, various components are included in the head unit of the vehicle, such as displays, speakers, microphones, hardware input controls, etc. Receiving and processing user input, either at a mobile device within a vehicle or at the head unit of the vehicle, has numerous challenges and limitations that may result in improper actions and may frustrate a user.

SUMMARY

It has been observed by the inventors that dismissing a user interface element in an automobile context can be conveniently achieved without much user attention to the task, thereby not distracting a driver from other operations; but to achieve this effectively requires a solution to be provided in a manner which enables the user to execute the gesture with minimal attention to the gesture and touch screen. To this end, an innovative aspect of the subject matter described in this specification is enabling a user in an automotive setting to more easily and accurately dismiss a user interface (UI) element that is being displayed on a screen.

One innovative aspect of the subject matter described in this specification is embodied in methods that may include the actions of operating a device with a touchscreen using a first touch input threshold value, wherein touch input threshold values correspond to a minimum distance of input to the touchscreen to identify a swipe gesture; detecting an automobile mode event that initiates an automobile mode for the device; after detecting the automobile mode event, receiving a user input to the touchscreen of the device; based on detecting the automobile mode event that initiated the automobile mode for the device, using a second touch input threshold value for the user input to the touchscreen of the device; determining, using the second touch input threshold value, that the user input to the touchscreen of the device corresponds to a swipe gesture originating on a user interface element displayed on the device; and in response to determining that the user input to the touchscreen of the device corresponds to a swipe gesture originating on the displayed user interface element, dismissing the user interface element so that the user interface element is removed from being displayed.

According to another aspect of the subject matter described in this specification, the methods that include the actions of detecting dismissal of a particular user interface element so that the particular user interface element is removed from being displayed; obtaining a user interface element suggestion for another user interface element to be displayed; generating an identification for the other user interface element based on a hash of predetermined elements of content associated with the other user interface element based on a type of user interface element; comparing the generated identification to a list of identifications associated with previously dismissed user interface elements stored in a storage device; and in response to the comparison indicating that the generated identification corresponds to a previously dismissed user interface element identification, determining that the other user interface element is prohibited from being displayed.

The methods may also include the actions of, in response to determining that the other user interface element is prohibited from being displayed, terminating the user interface element suggestion and obtaining a new user interface element suggestion for a new user interface element to be displayed.

These and other embodiments may each optionally include one or more of the following features. For instance, in certain implementations, detecting the automobile mode event comprises one or more of: determining that the location of the device is in an automobile, detecting movement of the device consistent with being in a moving automobile, receiving input of an automobile mode setting by a user, detecting placement of the device in an automobile receiver for the device, detecting a wired or wireless data connection between the device and automobile, and determining that a particular application is open on the device.

In addition, in certain implementations, the device is one or both of: a mobile device and an automobile head unit, and wherein the touchscreen on which the user interface element is displayed is one or both of: a touchscreen forming part of the mobile device, and a touchscreen forming part of the automobile head unit to which the mobile computing device is connected by a wired or wireless data connection.

Further, for instance, in certain implementations, the user interface element comprises a user notification. In certain implementations, in response to dismissing the user interface element so that the user interface element is removed from being displayed, displaying a user input element for user feedback regarding the user interface element that was dismissed.

Moreover, in certain implementations, determining that the user input to the touchscreen of the device corresponds to a swipe gesture originating on a user interface element displayed on the device comprises determining that a touch input velocity satisfies a swipe velocity threshold. In some implementations, initiating the automobile mode causes a different velocity threshold to be set, compared to a velocity threshold used by a device when not in the automobile mode.

Other embodiments of these aspects include corresponding systems, apparatus, and computer programs, configured to perform the actions of the methods, encoded on computer storage devices. For instance, a system comprising one or more computers and one or more storage devices storing instructions that are operable, when executed by the one or more computers, to cause the one or more computers to perform operations.

Implementations may provide one or more of the following advantages. For example, the safety of driving while using a touchscreen interface can be improved, by decreasing the opportunity for erroneous or inadvertent inputs. The input processing parameters of a device can be set to allow greater certainty to the user while allowing a clear control for dismissing unwanted display content. The parameters can account for increased variability of inputs that are likely to occur due to movement of a vehicle or increased distance of the touchscreen from the user. In some implementations, the parameters that are set can be specific to inputs that correspond to specific types of actions. For example, within an automobile mode, different thresholds used to determine gestures representing the dismissal of displayed content and gestures used for other actions. A swipe gesture that originates on a dismissible message may be evaluated using a different set of parameters (e.g., distance and velocity thresholds), than a swipe gesture that does not originate on a dismissible message (e.g., a swipe used for scrolling a list). This can help vary the responsiveness of a user interface to interaction with different elements, even for the same type of gesture or input (e.g., a swipe). As a result, gestures to dismiss an element and remove it from display may be less responsive, e.g., requiring more strict criteria, to avoid accidental or unintended inputs that would be difficult for a user to correct or reverse. At the same time, gestures for other elements or actions (e.g., list scrolling) may be more responsive due to the use of less strict criteria.

As additional examples, in some implementations, the system can automatically transition between different sets of user input processing parameters for a first mode for use of a mobile device outside a vehicle and a second mode for use of the mobile device outside the vehicle. In some cases, the mobile device can detect whether an automobile mode should be initiated or deactivated, to automatically provide enhanced user input processing. Distractions to drivers can be reduced. For example, after a user has dismissed a message, the system can log the dismissal and prevent the same message or a similar message from being subsequently displayed. This avoids the need for users to repeatedly dismiss recurring messages, allowing drivers more consistent attention to driving.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
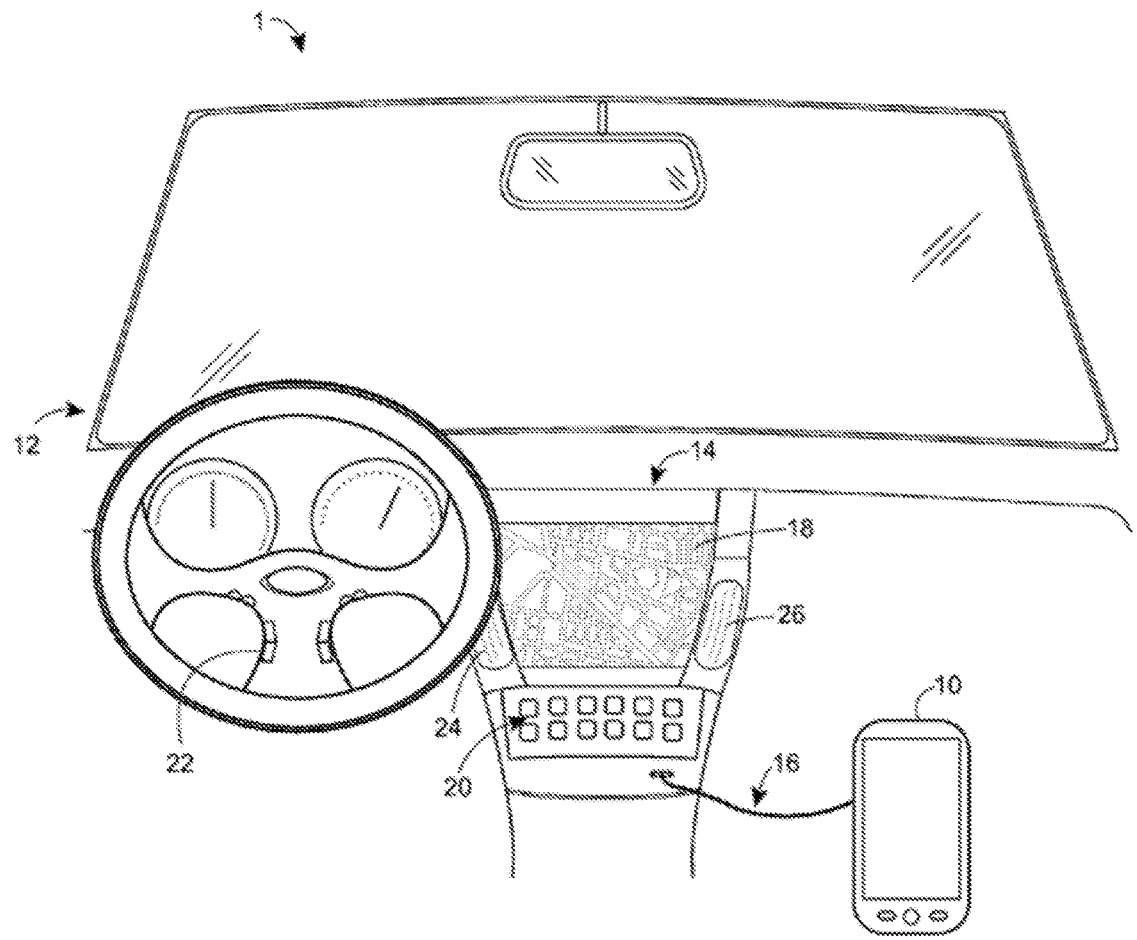
FIG. 1 is a diagram of an example system, according to embodiments of the disclosure.

FIG. 1 is a diagram of an example system 1 according to embodiments of the disclosure. System 1 includes a portable device 10 and a vehicle 12 with a head unit 14. The portable device 10 may be, for example, a smart phone or a tablet computer. The portable device 10 may communicate with the head unit 14 of the vehicle 12 via a communication link 16, which may be wired (e.g., Universal Serial Bus (USB) or the like) or wireless (e.g., Bluetooth, Wi-Fi Direct, or the like). The portable device 10 also may communicate with various content providers, servers, etc. via a wireless communication network such as a cellular network or other wireless network.

The head unit 14 may include a display 18 for presenting information, such as a digital map, notifications, directions, or the like. These user interface elements may be displayed on the display 18, on the display of the portable device, or both. The display 18 may include a touchscreen, which may include a software keyboard for entering text input. There may be hardware input controls 20 and 22 on the head unit 14 and the steering wheel, respectively, which may be used for entering alphanumeric characters or to perform other functions based on the input. In addition, or alternatively, there may be a rotary input device that rotates and receives a press input, similar to the click of a computer mouse. Thus, some examples of input mechanisms that may be used in this system include resistive touchscreens, capacitive touchscreens, touch pads, rotary dials, and systems with any combination thereof, such as a system with a touchscreen and rotary dial.

These input mechanisms may allow a user to advance or move back through an ordered or otherwise structured set of displayed items or user interface elements, as well as select one or more of the displayed items or user interface elements. For example, the items may be informational user interface elements corresponding to search results or applications (i.e., "apps"), automatic suggestions for a certain category (e.g., gas stations in a fifteen-mile radius), map tiles that make up a digital map image, or any other informational elements. The user interface elements may be displayed on the display 18 of the head unit 14, on the display of the portable device 10, or both. The head unit 14 also may include audio input and output components such as a microphone 24 and speakers 26, for example. In some implementations, the speakers 26 may be used to play audio instructions sent from the portable device 10.

Referring to FIG. 1, as one, non-limiting example implementation, the portable device 10 may obtain navigation data to navigate the driver from point A to point B in the form of a sequence of instructions or maneuvers. For example, the portable device 10 may receive navigation data via a communication network from a navigation service or may generate navigation data locally, depending on the implementation. The portable device 10 may send and receive data to and from the head unit 14 through the communication link 16. In some implementations, more than one portable device 10 may communicate with the head unit 14 of the vehicle 12 via a communication link 16. In some implementations, one portable device 10 may communicate with the head unit 14 and serve as a primary or master portable device while one or more other portable devices communicate with the head unit 14 through the primary or master portable device.

In such a system as depicted in FIG. 1, a driver or passenger may need to dismiss a user interface (UI) element of low importance that is being displayed. The input screen may be projected from the portable device 10 into the head unit 14 or may operate in a portable device only mode. As described above, the system may include any of a number of input mechanisms or a combination of different input mechanisms, and the present system is configured to allow a user to dismiss a user interface element in systems with any of those input mechanisms or a combination of those input mechanisms. For example, with a touchscreen input mechanism, the user may perform a swipe gesture on user interface element displayed on the touchscreen to dismiss the user interface element so that it is no longer displayed. In general, a swipe gesture may be triggered by detecting when a finger or other input object touches a user interface element that is dismissible, and then detecting that touch event moving beyond a threshold distance in the x-direction. That threshold distance in the x-direction may be specific to the mode the system is operating in, such that a particular predetermined threshold distance is used in a driving or automobile mode. Such a specialized threshold is necessary to account for the different manner of input in a vehicle environment as compared to, for example, a user holding a portable device in the user's hand.

Figure 2B:
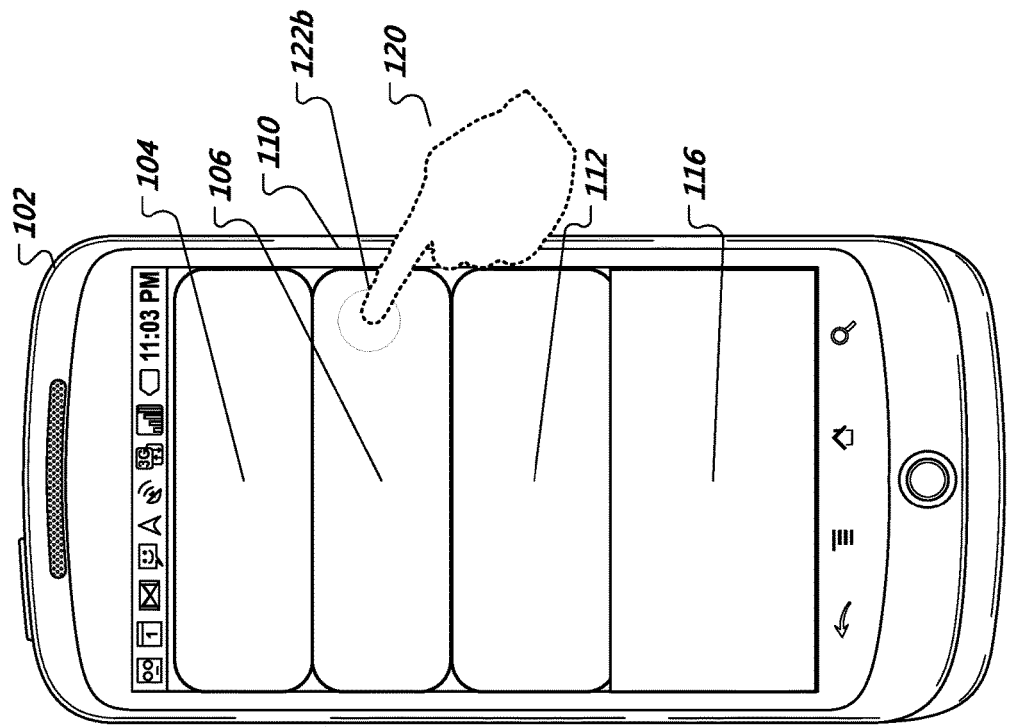
FIGS. 2A and 2B depict a diagram of an example device, according to embodiments of the disclosure.
Figure 2A:
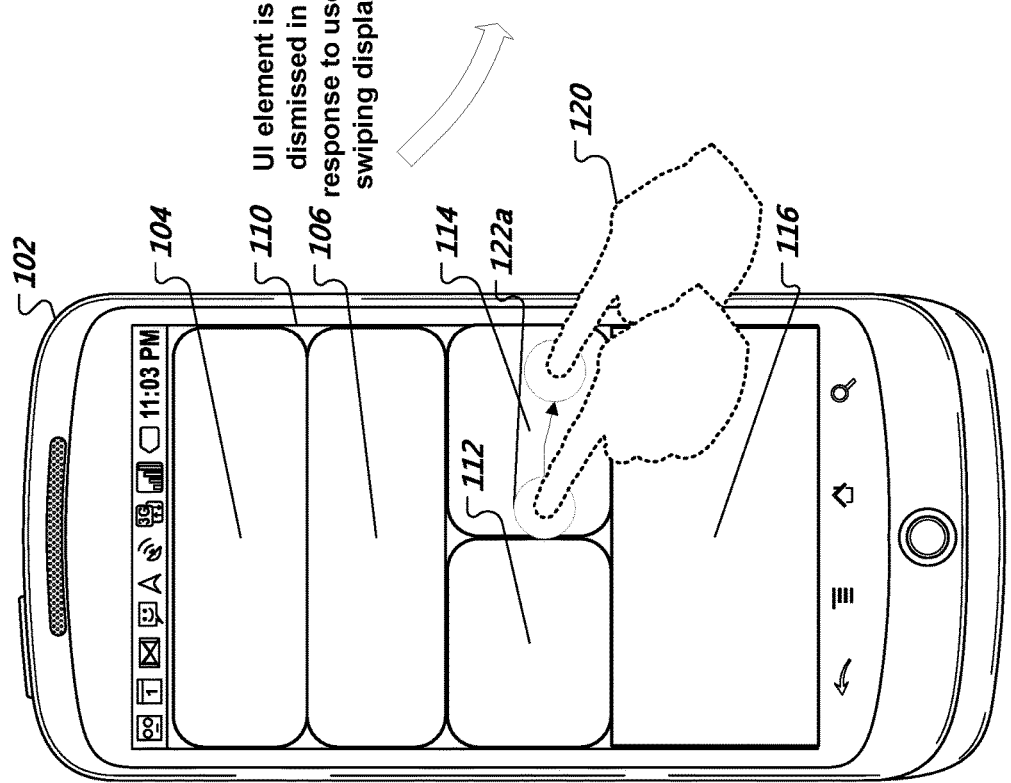

FIGS. 2A and 2B depict a diagram of an example device 102, according to embodiments of the disclosure. The device 102 may be a portable device, such as a cellular phone, tablet, laptop, assistant device, or other computing device. The device 102 may include a display 110. The display 110 may include a touchscreen interface, such as a resistive touchscreen, capacitive touchscreen, or the like. The display 110 may display to a user several user interface elements, such as 104, 106, 112, 114, and 116. As described above, the user interface elements may provide information to a user. Different user interface elements may have a similar size and shape, such as user interface elements 104 and 106, while other user interface elements may have a different size and shape, such as user interface element 112. A portion 116 of the display may be void of user interface elements and may provide other visible information to the user. One or more of the user interface elements may not be dismissible. In other words, for example, user interface element 104 may be displayed and a user may be prevented from dismissing user interface element 104 from the display with an input. Rather, user interface element 104, for example, may need to be removed from the display through user settings.

In operation, a user may use their finger 120 as an input member or may use any other input member to make contact with the touchscreen. As depicted in FIG. 2A, the user's finger 120 may contact the touchscreen at a location where user interface element 114 is displayed. The touchscreen receives the input at 122a.

In general, as depicted in FIG. 2A, device 102 may detect when a finger 120 touches an element 114 which is dismissible and then may detect that touch event 122a moving beyond a predetermined threshold in the x-direction. Once touch has been detected, the user interface element being displayed at the touch location may be highlighted and the user interface element may be animated to move along with the position of the current location of finger 120 at which the touchscreen is receiving input. At each registered move point the velocity of the input touch may be determined. Once the finger 120 lifts or a touch input cancel event occurs, the input corresponding to that input event or gesture is stopped. At the end of the gesture, if a cancel event is determined, an animation is triggered to restore the user interface element back to the original location and state of the user interface element before the touch input was received. At the end of the gesture, if no cancel event is determined, the system may calculate if the input gesture translated the user interface element a distance in the x-direction that satisfies a predetermined threshold distance. If the predetermined threshold distance is satisfied, the user interface element may be animated to be dismissed from being viewable on the display. In addition, the system may determine whether the velocity of the gesture satisfies a predetermined velocity threshold. In some implementations, the predetermined velocity threshold may be zero. In implementations with the velocity threshold, if one or both of the distance threshold and velocity threshold are satisfied, the user interface element may be animated to be dismissed from being viewable on the display.

For a non-touch mode input system, such as a touch pad, rotary dial, or the like, the input system may navigate a focus tree of user interface elements. For example, a current user interface element may be indicated by a highlight or other visible alteration of that particular user interface element that is currently selectable. Each user interface element that is navigable and selectable is one that the user could select or click. The system may create a tree of all user interface elements that selectable and the system may navigate the tree of user interface elements using a tree-walking algorithm to arrange the tree in a one-dimensional array of selectable user interface elements. This array of user interface elements may represent the order and set of user interface elements that the user can navigate through. When a rotary dial is used as input mechanism by, for example, rotating the dial, the next user interface element in the array will be indicated as being selectable. In some implementations, the layout of user interface elements according to the array allows the user to navigate the user interface elements in a left-to-right, then top-to-bottom manner, similar to western reading order. In some implementations, the layout of user interface elements according to the array allows the user to navigate the user interface elements in a right-to-left, then top-to-bottom manner, opposite to western reading order.

To dismiss a user interface element in the non-touch mode, the user can initiate a long press or click in the input device. At the start of the long click input, the system may animate a user interface element background ripple or other visible indicator to indicate a click start. In some implementations, the background ripple or other visible indicator may increase, grow, or intensify until a long press threshold has been reached. If the system detects a click or press that satisfies the long press threshold, the system may determine that a long press is detected. In response to that determination, the system may display an alternate view or form of the user interface element as a confirmation of dismissal. For example, a portion of the user interface element may be highlighted, an "X" may be displayed, or the like, or any combination thereof. Because an accidental long press is more likely to occur in an automotive setting, the confirmation of dismissal allows the user to prevent unwanted dismissal and confirm that the user interface element is intended to be dismissed. If the system receives input confirming dismissal, the user interface element may be animated to be dismissed from being viewable on the display similar to the touch input mode. Although this dismissal confirmation has been described with reference to the non-touch based input mode, the same or similar dismissal confirmation may be used for any input mode, including a touch input mode or a combination touch and non-touch input mode.

In addition, regardless of the input mode, during the dismiss confirmation process, the system may detect a user cancellation of the dismiss through one or more of several dismiss cancel operations, including, for example: a touch input received for any user interface element outside the user interface element for which dismissal is being confirmed; voice or other input received to trigger a device assistant; receiving input to switch to a different user interface; receiving input to navigate away from the user interface element for which dismissal is being confirmed; or the like. In systems that have both touch and non-touch input systems, for example a touchscreen and a rotary dial, if the system detects a change from one input mode to the other, the system may cancel any pending user interface element dismissal. In response to receiving a cancel input, i.e., a cancel event, the system may abort the dismiss process and an animation may be triggered to restore the user interface element back to the original location and state of the user interface element before the input for that user interface element was received.

Figure 3:
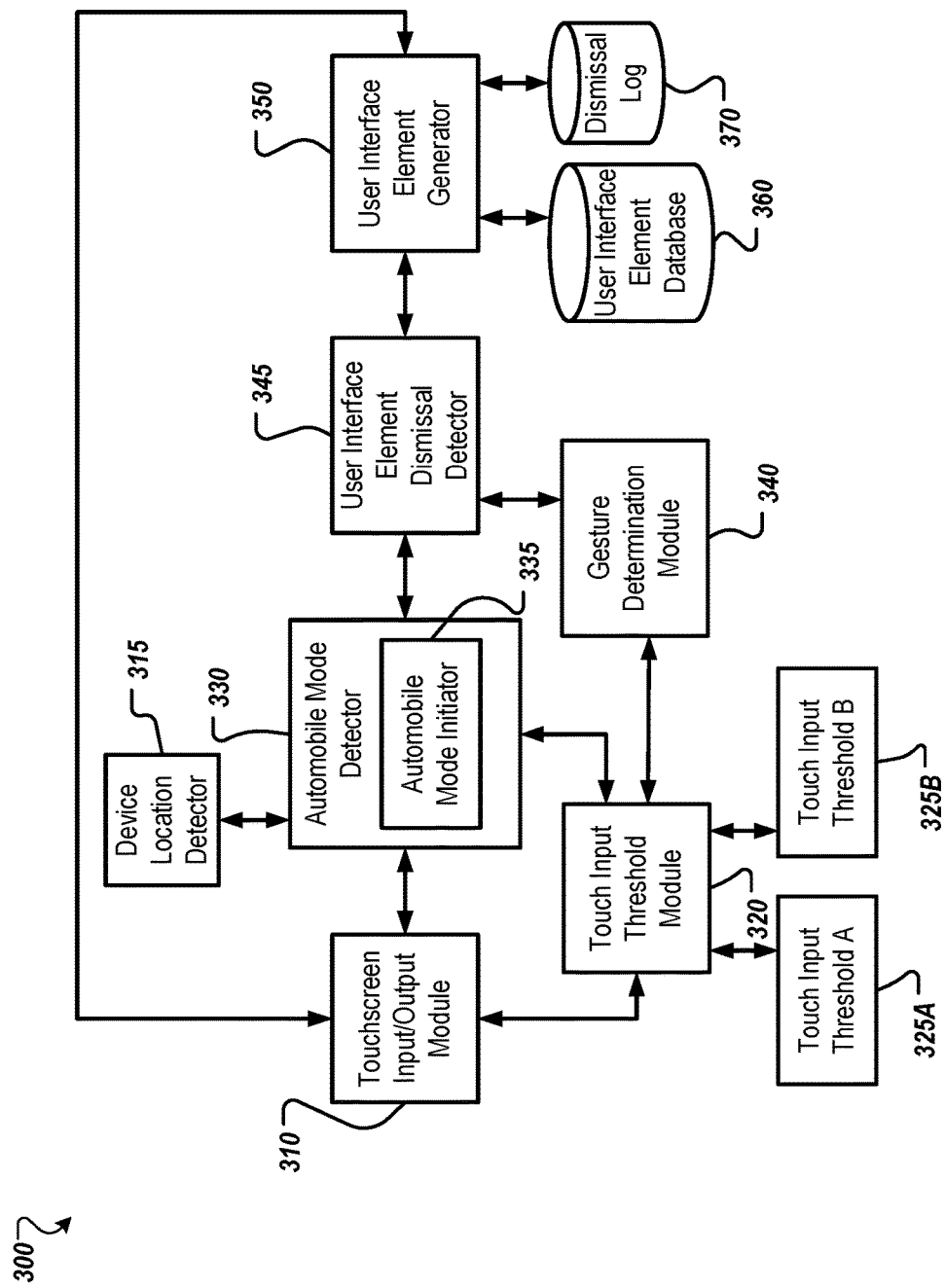
FIG. 3 is a diagram of an example system, according to embodiments of the disclosure.

FIG. 3 is a diagram of an example system 300, according to embodiments of the disclosure. System 300 may include a touchscreen input/output (I/O) module 310 that may process input received by the touchscreen of a device and output data to the touchscreen. A touch input threshold module 320 in system 300 may detect whether a touch event includes touch input moving beyond a predetermined threshold in the x-direction. For example, touchscreen I/O module 310 and touch input threshold module 320 may detect a touch input and determine a distance of travel in the x-direction that the touch input was received. The touch input threshold module 320 may compare that to a touch input threshold 325A or a touch input threshold 325B, depending on the mode of operation determined by automobile mode detector 330.

As part of system 300, automobile mode detector 330 may determine whether an automobile mode event occurs, such that the device is operating in automobile mode. For example, automobile mode detector 330 may detect the automobile mode event based on determining that the location of the device is in an automobile using device location detector 315. In response to automobile mode detector 330 detecting the automobile mode event, an automobile mode initiator 335 may initiate operation in the automobile mode. As other examples, automobile mode detector 330 may: detect movement of the device consistent with being in a moving automobile, determine that input is received of an automobile mode setting by a user, detect placement of the device in an automobile receiver for the device, detect that a wired or wireless data connection has been established between the device and automobile, determine that a particular application is open on the device, or the like, or any combination thereof. Thus, in response to automobile mode detector 330 detecting the automobile mode event and automobile mode initiator 335 setting the automobile mode, the touch input threshold module 320 may use touch input threshold 325B in the comparison with the touch input distance rather than using touch input threshold 325A, which may instead be used in a non-automobile mode.

The system 300 may also include a gesture determination module 340. The gesture determination module 340 may receive a comparison result from the touch input threshold module 320, and may determine whether the touch input corresponds to a particular gesture. In particular, for purposes of the present disclosure, gesture determination module 340 may determine whether the received touch input corresponds to a swipe dismissal gesture. For example, gesture determination module 340 may determine that the user input to the touchscreen of the device corresponds to a swipe gesture originating on a user interface element displayed on the device. In some implementations, the gesture determination module 340 may account for whether a detected touch input velocity satisfies a predetermined touch velocity threshold.

In response to an indication from the gesture determination module 340 that the touch input corresponds to a swipe dismissal gesture on a particular user interface element, a user interface element dismissal detector 345 may determine that the particular user interface element needs to be dismissed and initiate the dismissal process. In addition, based on detecting the user interface element dismissal, the user interface element dismissal detector 345 may initiate storage of the dismissed user interface element in a dismissal log 370. The dismissal log 370 may store a list of dismissed user interface elements and corresponding data associated with each dismissed user interface element.

In some implementations, upon indication of a user interface element dismissal, a new user interface element may be suggested for display by a user interface element generator 350. The user interface element generator 350 may access a user interface element database 360 to retrieve the suggested new user interface element. The user interface element database 360 may store a plurality of user interface elements and corresponding data associated with each user interface element. In addition, the user interface element generator 350 may generate a user interface element ID for the suggested new user interface element. Further, the user interface element generator 350 may compare the generated user interface element ID for the suggested new user interface element with user interface element IDs stored in the dismissal log 370, which correspond to user interface elements that have been previously dismissed. Based on the outcome of that comparison, which is described in more detail below, the user interface element generator 350 may either provide the suggested new user interface element to the touchscreen I/O module 310 to be displayed on the touchscreen, or retrieve a different suggested new user interface element and repeat the user interface element ID generation and comparison process for the different suggested new user interface element.

In some implementations, not all user interface elements are allowed to be dismissed. For example, for each user interface element type, there may be multiple dismiss event options. As non-limiting examples, some of the dismiss event options include: a "not dismissible" attribute, for which the user interface element may be movable with touch, as described above, but once moved a predefined distance, the visible movement of the user interface element will attenuate to give the sense of the user interface element resisting the swipe gesture or movement in the x-direction; a "dismiss until next update" attribute, which, although dismissed as not important currently, may be more relevant or useful in the future, so that the user interface element may be dismissed, but any update to the user interface element will display the user interface element again; and a "dismissed for the session" attribute, which allows user interface elements to be dismissed for a given device usage session, such that the dismissed user interface element is not displayed again during that device usage session. For example, a device usage session may be usage of the device in the automobile mode until the device exits the automobile mode or an automobile mode application is closed. Alternatively, a device usage session may be defined as a given travel session by detecting when the user has reached an intended destination for termination of the session.

As a non-limiting example of a "dismiss until next update", a messaging user interface element may be dismissed until the next conversation update, at which time the messaging user interface element will be displayed again. Further, the messaging user interface element may also provide an example of a "dismissed for the session" attribute, in which a "mute" feature is provided for the conversation so that the messaging user interface element is dismissed and not displayed again for that device usage session.

As described above, once a user interface element is dismissed the user interface element ID is stored, for example in dismissal log 370, which may be queried each time the system attempts to add or update a user interface element. The system may use the dismissal log 370 to check if the user interface element in question has been dismissed by querying the dismissal log 370. If the user interface element ID is in the dismissal log 370, the user interface element may be prevented from being displayed to the user. In some implementations, certain user interface elements may be allowed to reappear after being dismissed. The system may use the stored user interface element ID or may use data stored in association with the user interface element ID to determine whether the user interface element is allowed to reappear after being dismissed.

In one, non-limiting example implementation, a user interface element related to navigation or media may not be dismissible and may be prevented from being dismissed. Further, for example, a flight reminder user interface element or a navigation suggestion may be dismissible and may be prevented or prohibited from reappearing after being dismissed. In addition, for example, a messaging user interface element or third-party application user interface element may be dismissible and may be allowed to appear again even after being dismissed. Moreover, for some user interface element types, such as a received message user interface element, past dismiss events may be ignored or overridden and the user interface element may be displayed if a new message is received even after the user already dismissed the received message user interface element in the current user session.

A user interface element ID uniquely identifies a single user interface element within all user interface elements of the same type of user interface elements. The combination of user interface element ID and the user interface element type is sufficient to uniquely identify a particular user interface element among all user interface elements. Accordingly, the user interface element ID and user interface element type pair being unique across all user interface elements and across all device usage sessions enables an accurate determination as to whether a particular user interface element has been dismissed. Thus, for example, for an instant message user interface element type, the ID may be generated as a hash of user identification, name of application, status notification identifier, or any combination thereof. As other, non-limiting examples, the ID for a SMS message user interface element type and the ID for a received call user interface element type may be generated as a hash of the contact phone number; the ID for a navigation suggestion user interface element type may be generated as a hash of the suggestion title; the ID for a third-party user interface element type may be generated as a hash of the application name, the content title provided by the application, or any combination thereof; the ID for a traffic user interface element type may be generated as a hash of the traffic caption, an incident identifier, or any combination thereof; the ID for a calendar reminder user interface element type may be generated as a hash of the event name, date, time, or any combination thereof; the ID for a flight reminder may be generated as a hash of the flight number, date, time, flight status, or any combination thereof; the ID for a hotel reminder may be generated as a hash of the name, address, date, or any combination thereof; the ID for a general reminder may be generated as a hash of the title, date, time, or any combination thereof; the ID for an event reminder or car rental reminder or restaurant reservation reminder may be generated as a hash of the name or title, date, time, address, or any combination thereof.

By generating the ID in this manner, the system can more easily identify UI elements that are substantively similar (e.g., have similar topics or content), even if the UI elements are not identical. Further, by programmatically setting the IDs based on message origin and content, no comprehensive identification system is needed. It would be a challenge to uniquely track and catalog all of the varied UI elements messages that could occur. This is not needed, however, because the key substantive elements of a UI element can be used to generate the ID for an element from the element itself. Because the important characteristics of UI elements and messages vary depending on the type, (e.g., calendar reminder, hotel reminder, navigation instruction, etc.), the type of content used to generate the ID can vary for each type. By tracking dismissed elements with this type of ID, the system can identify and block display of new elements that are created in the future and are substantially related to previously dismissed elements. For example, if a user dismisses a first hotel reminder, for a hotel having a certain name, address, and date of stay, the ID generated based on those parameters is stored. If a new hotel reminder is later proposed for the same name, address, and date, the system can generate the ID for the new reminder and determine that it matches the previously dismissed ID. In response, even if some message content of the new message differs from the first hotel reminder, the system can block the display of the new reminder on the basis that matching IDs demonstrate that the user already saw and dismissed the same or similar content. This can reduce the amount of irrelevant and distracting changes that are made to a user interface. At a certain interval, such as after 24 hours, the entry of a dismissal ID in log data may be removed to allow UI elements related to that content to again be provided.

A dismissal of a user interface element may indicate that the user interface element or a type of the user interface element is not useful or is not relevant to the user. A feedback loop may be implemented that accounts for dismissals of user interface elements in determining how often or whether a particular user interface element or type of user interface element is displayed in the future. In certain implementations, each dismissal of a user interface element may have a small influence on how often or whether the user interface element is displayed in the future. In certain implementations the number of times that a user interface element is dismissed may be logged and stored, for example, in association with the user interface element ID. If a particular user interface element or type of user interface element is dismissed a number of times that satisfies a predetermined threshold number of dismissals, the particular user interface element or type of user interface element may be displayed less frequently in the future. For example, the number of dismissals may have an inverse relationship with the frequency of display, such that the greater the number of dismissals, the less frequent the display. In certain implementations, in response to a particular user interface element or type of user interface element being dismissed a number of times that satisfies a predetermined threshold number of dismissals, additional feedback may be sought from the user regarding the particular user interface element or type of user interface element. For example, additional feedback may be sought by displaying a message regarding the particular user interface element or type of user interface element seeking additional input from the user regarding the particular user interface element or type of user interface element.

Although gesture-based input is described herein with reference to touchscreen input, in general the techniques of this disclosure need not be limited to two-dimensional surface gestures. Gesture input in other implementations can include three-dimensional (3D) gestures, such as trajectories of the portable device in a 3D space that fit certain patterns (e.g., the user making a flicking motion forward or backward while the portable device is in her hand). In these implementations, the display of a structured set of items provided via the head unit and/or the portable device may be manipulated or altered in response to such a 3D gesture. Further, 3D gestures in some implementations can be detected via video cameras and/or other sensors and processed in accordance with computer vision techniques.

Figure 4A:
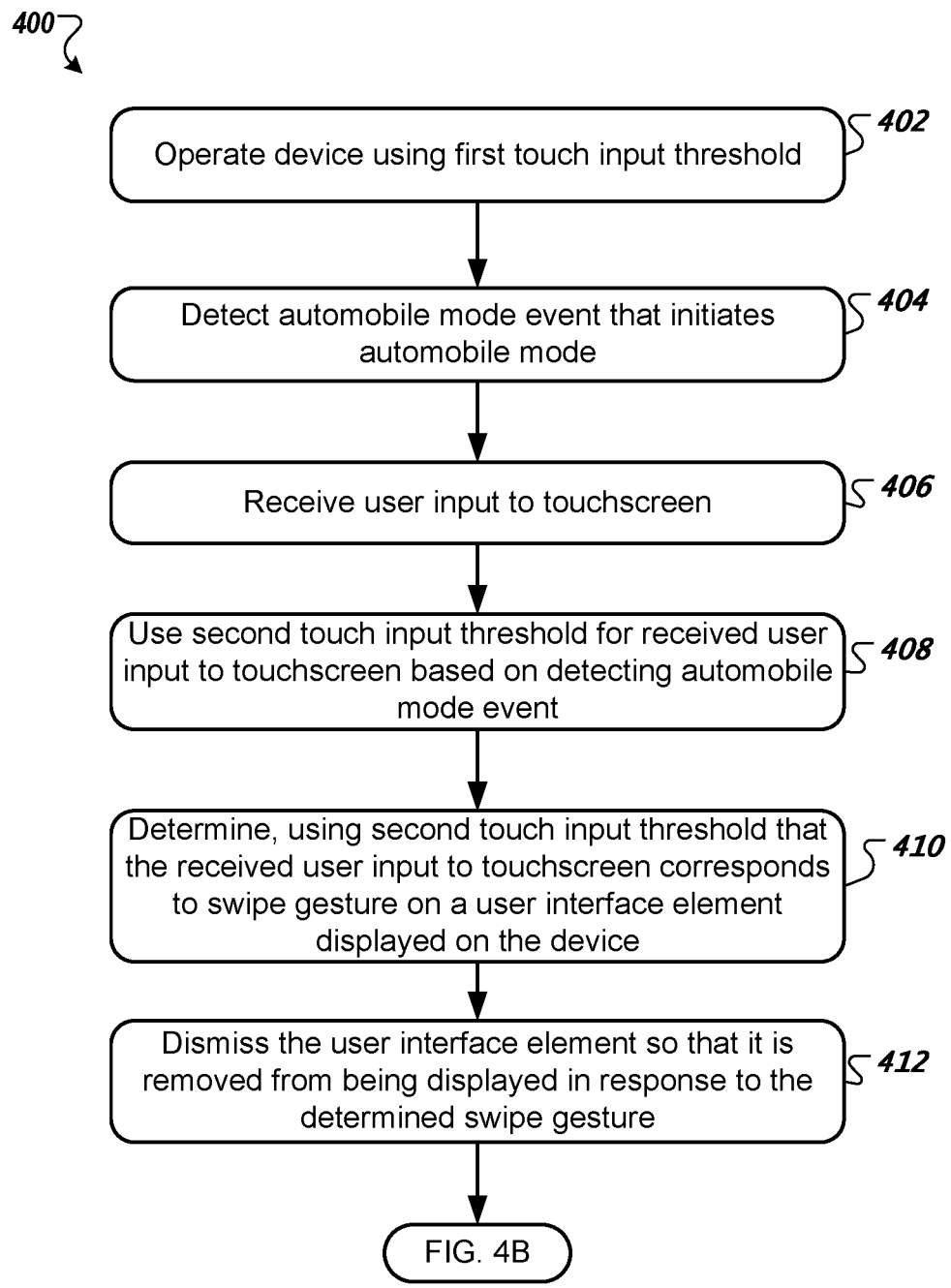
FIGS. 4A and 4B depict a flow chart illustrating example processes for dismissing a UI element being displayed on a screen, according to embodiments of the disclosure.
Figure 4B:
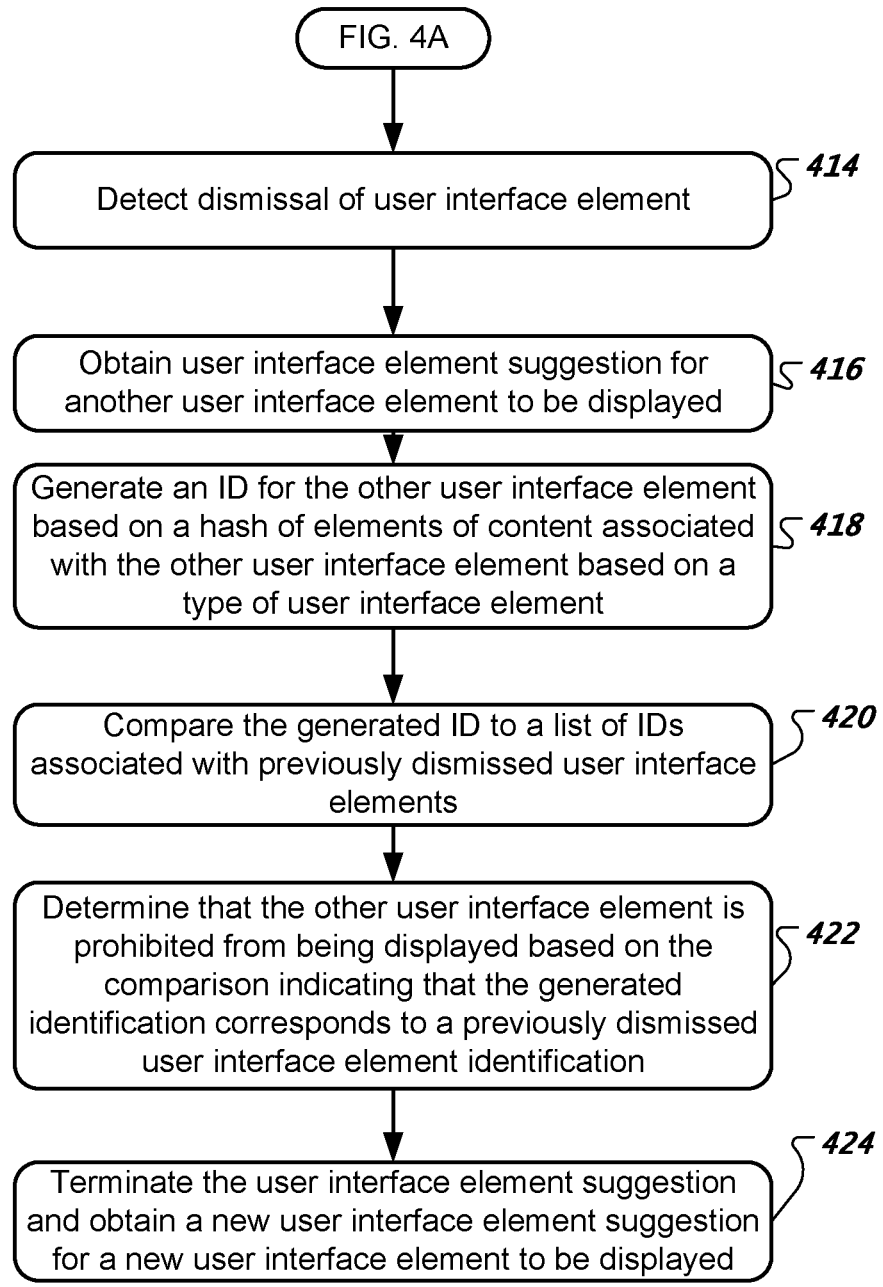

FIGS. 4A and 4B depict a diagram of an example process for dismissing a user interface element being displayed on a screen. The process 400 may be performed using one or more computing devices such as the portable device 10 from FIG. 1, the system 300 from FIG. 3 via a server or network of servers, etc.

Referring to FIG. 4A, process 400 includes, at 402, operating a device with a touchscreen using a first touch input threshold value. As described above, each touch input threshold value corresponds to a minimum distance of input to the touchscreen to identify a swipe gesture. At 404, the system detects an automobile mode event that initiates an automobile mode for the device. Detecting the automobile mode event at 404 may include one or more of: determining that the location of the device is in an automobile, detecting movement of the device consistent with being in a moving automobile, receiving input of an automobile mode setting by a user, detecting placement of the device in an automobile receiver for the device, detecting a wired or wireless data connection between the device and automobile, and determining that a particular application is open on the device.

After detecting the automobile mode event and initiating the automobile mode, the system receives a user input to the touchscreen of the device at 406. Based on detecting the automobile mode event that initiated the automobile mode for the device, at 408, a second touch input threshold value is utilized for the user input to the touchscreen of the device. This second touch input threshold can be different from the first touch input threshold. The second touch input threshold may increase or decrease the difficulty of registering a dismissal command by a user, e.g., by expanding or narrowing the range of gestures considered to represent a dismissal command or other user input. In some implementations, the second touch input threshold value is greater than the first touch input threshold value. In other words, due to the increased variability and reduced precision for input in the automotive context, a higher minimum amount of distance or a higher minimum velocity may be required for the device to register a swipe that dismisses a visible element (e.g., a notification card or other message). This more strict standard may reduce the risk that unintentional inputs are registered as dismissals. By contrast, the threshold for the automotive context may be less strict, e.g., with a lower minimum distance or velocity needed for a gesture, for example, to reduce the amount of precision or concentration needed for a user to make a dismissal while driving. More generally, the device may set different interaction parameters for different contexts (e.g., in vehicle or not, in motion or not, etc.), and may set different threshold for different applications or modes of operation of the device.

At 410, the system determines, using the second touch input threshold value, that the user input to the touchscreen of the device corresponds to a swipe gesture originating on a user interface element displayed on the device. In response to determining that the user input to the touchscreen of the device corresponds to a swipe gesture originating on the displayed user interface element, at 412, the system dismisses the user interface element so that the user interface element is removed from being displayed. In some implementations, the process 400 proceeds to the process depicted in FIG. 4B.

Referring to FIG. 4B, the process 400 may include, at 414, detecting dismissal of a particular user interface element so that the particular user interface element is removed from being displayed. At 416, the system obtains a user interface element suggestion for another user interface element to be displayed. The system also generates an identification for the other user interface element, at 418, based on a hash of predetermined elements of content associated with the other user interface element based on a type of user interface element, as described above. At 420, the system compares the generated identification to a list of identifications associated with previously dismissed user interface elements stored in a storage device. In response to the comparison indicating that the generated identification corresponds to a previously dismissed user interface element identification, at 422, the system determines that the other user interface element is prohibited from being displayed. In response to determining that the other user interface element is prohibited from being displayed, at 424, the system terminates the user interface element suggestion and obtains a new user interface element suggestion for a new user interface element to be displayed.

In embodiments described herein, the techniques may be implemented in a portable device, a head unit of a car, one or several network servers, or a system that includes more than one of these devices.

Figure 5:
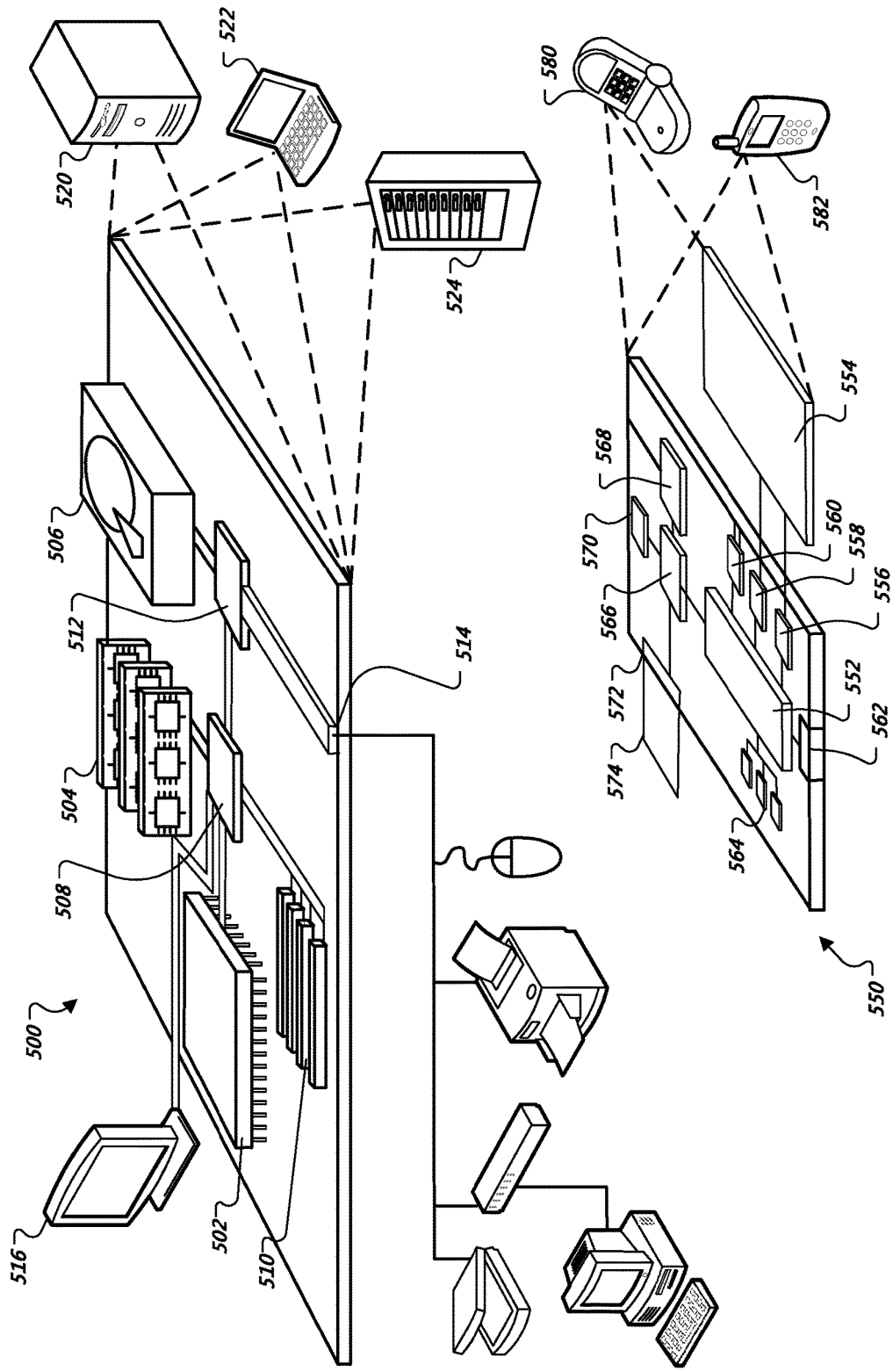
FIG. 5 depicts a computer device and a mobile computer device that may be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion user interface elements (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 640, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 648 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) user interface element interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM user interface elements, along with additional information, such as placing identifying information on the SIMM user interface element in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

A number of implementations have been described. Nevertheless, it will be understood that various modifications may be made without departing from the spirit and scope of the disclosure. For example, various forms of the flows shown above may be used, with steps re-ordered, added, or removed.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., a field programmable gate array (FPGA) or an application specific integrated circuit (ASIC). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network, e.g., the Internet, and peer-to-peer networks, e.g., ad hoc peer-to-peer networks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any innovations or of what may be claimed, but rather as descriptions of features specific to particular embodiments of particular innovations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where a table or hash table is mentioned, other data structures, such as spreadsheets, relational databases, structured files, or the like, may be used.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   operating a device with a touchscreen using a first touch input threshold value, wherein the first touch input threshold values is a first minimum distance of input along the touchscreen prior to the device identifying the input as a gesture;
   initiating operation of the device in an automobile mode in response to one or more of:
      determining that a location of the device corresponds to a location of an automobile;
      determining that movement of the device is consistent with being in a moving automobile;
      receiving an input to enable an automobile mode of the device;
      detecting placement of the device in a receiver for the device in the automobile;
      detecting a wired or wireless data connection between the device and the automobile; or
      determining that a particular application is executing at the device,
   wherein, while operating in the automobile mode, the device uses a second touch input threshold value that is a second minimum distance of input along the touchscreen prior to the device identifying the input as the gestures, and wherein the second minimum distance is greater than the first minimum distance;
   after initiating the automobile mode:
      receiving a user input at the touchscreen of the device;
      determining, by the device and based on the second touch input threshold value, whether the user input is a gesture corresponding to a user interface element displayed by the touchscreen of the device; and
   in response to determining that the user input is the gesture corresponding to the user interface element, dismissing the user interface element so that the touchscreen ceases displaying the user interface element.

2. The method of claim 1, wherein the user input is a swipe gesture originating on a user interface element displayed by the touchscreen of the device.

3. The method of claim 1,
   wherein the device comprises one or both of: a mobile device and an automobile head unit; and
   wherein the touchscreen on which the user interface element is displayed comprises one or both of: a touchscreen forming part of the mobile device, and a touchscreen forming part of the automobile head unit to which the mobile computing device is connected by a wired or wireless data connection.

4. The method of claim 1, wherein the user interface element comprises a user notification, and, in response to dismissing the user interface element so that the user interface element is removed from being displayed, displaying a user input element for user feedback regarding the user interface element that was dismissed.

5. The method of claim 1, further comprising:
storing data indicating that the user interface element was dismissed, the data including an identifier for the user interface element that is derived from content or metadata of the user interface element.

6. The method of claim 1, further comprising:
obtaining a user interface element suggestion for a second user interface element for display;
generating an identifier for the second user interface element, wherein the identifier is derived using predetermined elements of content or metadata associated with the second user interface element;
comparing the identifier to a list of identifiers for user interface elements that were previously dismissed; and
determining whether to display the second user interface element based on the comparison.

7. The method of claim 6, wherein generating the identifier for the second user interface element comprises generating a hash of the predetermined elements of content or metadata associated with the second user interface element.

8. The method of claim 6, further comprising:
determining, based on the comparison, that the identifier for the second user interface element is not included in the list of identifiers; and
responsive to determining that the identifier for the second user interface element is not included in the list of identifiers, displaying the second user interface element.

9. The method of claim 6, further comprising:
determining, based on the comparison, that the identifier for the second user interface element is included in the list of identifiers; and
responsive to determining that the identifier for the second user interface element matches an identifier in the list of identifiers, determining to not display the second user interface element.

10. The method of claim 9, further comprising:
in response to determining that identifier for the second user interface element is included in the list of identifiers, terminating the user interface element suggestion and obtaining a new user interface element suggestion for a new user interface element to be displayed.

11. The method of claim 6,
wherein identifiers of user interface elements of different types are generated using different sets of predetermined elements,
wherein the method further comprises:
determining a user interface element type for the second user interface element; and
identifying a set of predetermined elements corresponding to the determined user interface element type, and
wherein generating the identifier for the second user interface element comprises generating the identifier based on portions of content or metadata of the second user interface element that correspond to the elements in the identified set of predetermined elements corresponding to the determined user interface element type.

12. A computing device comprising:
one or more processors;
a touchscreen; and
one or more storage devices storing instructions that are operable, when executed by the one or more processors, to cause the one or more processors to:
operate the device using a first touch input threshold value, wherein the first touch input threshold values is a first minimum distance of input along the touchscreen prior to the device identifying the input as a gesture;
initiate an automobile mode for the device in response to one or more of:
determining that a location of the device corresponds to a location of an automobile;
determining that movement of the device is consistent with being in a moving automobile;
receiving an input to enable an automobile mode of the device;
detecting placement of the device in a receiver for the device in the automobile;
detecting a wired or wireless data connection between the device and the automobile; or
determining that a particular application is executing at the device;
after initiating the automobile mode, receive an indication of a user input detected by the touchscreen;
determine, based on a second touch input threshold value, whether the user input is a gesture corresponding to a user interface element displayed by the touchscreen of the device, wherein the second touch input threshold value is a second minimum distance of input along the touchscreen prior to the device identifying the input as the gestures, and wherein the second minimum distance is greater than the first minimum distance; and
in response to determining that the user input is the gesture corresponding to the user interface element, dismiss the user interface element so that the touchscreen ceases displaying the user interface element.

13. The computing device of claim 12, wherein the user input is a swipe gesture originating on a user interface element displayed by the touchscreen.

14. The computing device of claim 12, wherein the computing device comprises one or both of: a mobile device and an automobile head unit; and
wherein the touchscreen on which the user interface element is displayed comprises one or both of: a touchscreen forming part of the mobile device, and a touchscreen forming part of the automobile head unit to which the mobile computing device is connected by a wired or wireless data connection.

15. One or more non-transitory computer-readable storage devices storing software comprising instructions executable by one or more processors of a device which, upon such execution, cause the one or more processors to:
operate the device using a first touch input threshold value, wherein the first touch input threshold values is a first minimum distance of input along a touchscreen of the device prior to the device identifying the input as a gesture;
initiate an automobile mode for the device in response to one or more of:
determining that a location of the device corresponds to a location of an automobile;
determining that movement of the device is consistent with being in a moving automobile;

receiving an input to enable an automobile mode of the device;

detecting placement of the device in a receiver for the device in the automobile;

detecting a wired or wireless data connection between the device and the automobile; or determining that a particular application is executing at the device;

after initiating the automobile mode, receive an indication of a user input detected by the touchscreen of the device;

determine, based on a second touch input threshold value, whether the user input is a gesture corresponding to a user interface element displayed by the touchscreen of the device, wherein the second touch input threshold value is a second minimum distance of input along the touchscreen prior to the device identifying the input as the gestures, and wherein the second minimum distance is greater than the first minimum distance; and in response to determining that the user input is the gesture corresponding to the user interface element, dismiss the user interface element so that the touchscreen ceases displaying the user interface element.

\* \* \* \* \*